United States Patent [19]

Newkirk et al.

[11] 4,217,394
[45] Aug. 12, 1980

[54] METAL MOLDS COATED WITH OXIDATIVE STABLE POLYOXYALKYLENE RELEASE AGENTS

[75] Inventors: David D. Newkirk; Robert B. Login, both of Woodhaven; Basil Thir, Grosse Ile, all of Mich.

[73] Assignee: BASF Wyandotte Corporation, Wyandotte, Mich.

[21] Appl. No.: 973,100

[22] Filed: Dec. 26, 1978

[51] Int. Cl.$^2$ .............................................. B32B 15/04
[52] U.S. Cl. .............................. 428/457; 106/38.22; 264/338; 427/135; 252/11; 252/52 A; 260/410.5; 560/254
[58] Field of Search .................... 427/135; 106/38.22; 252/11, 52 A; 264/338; 428/457; 260/410.5; 560/254

[56] References Cited

U.S. PATENT DOCUMENTS

| | | | |
|---|---|---|---|
| 2,677,700 | 5/1954 | Jackson et al. | 252/DIG. 1 |
| 2,784,108 | 3/1957 | Cupper | 427/135 |
| 2,786,080 | 3/1957 | Patton | 252/78.1 |
| 3,146,272 | 8/1964 | Lloyd | 260/611.5 |
| 3,253,932 | 5/1966 | White | 106/38.22 |
| 3,278,473 | 10/1966 | Judd | 264/338 |
| 3,504,081 | 3/1970 | Area | 264/338 |
| 3,551,553 | 12/1970 | Shannon | 264/338 |
| 3,578,594 | 5/1971 | Dombrow | 252/8.9 |
| 3,925,588 | 12/1975 | Marshall et al. | 428/395 |

FOREIGN PATENT DOCUMENTS 51-70397 6/1976 Japan ...................... 8/115.6 A
495138 3/1976 U.S.S.R. ...................... 427/135

*Primary Examiner*—Michael F. Esposito
*Assistant Examiner*—Sadie L. Childs
*Attorney, Agent, or Firm*—Andrew E. Pierce

[57] ABSTRACT

There are disclosed mold-release compositions suitable for lubricating metal molds which are used in molding natural and synthetic rubber and other polymers. The mold release agents of the invention are oxidation-stable homopolymer and copolymer, i.e., block or heteric polyoxyalkylene lubricant compounds. The lubricants of the invention can be used alone or in mixtures with prior art polyoxyalkylene lubricant compounds. The polyoxyalkylene mold release lubricants of the invention have the formula:

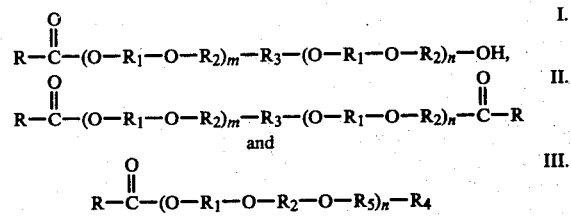

R is individually selected from alkyl groups of 1 to about 21 carbon atoms, preferably about 7 to about 21 carbon atoms, and most preferably about 12 to about 18 carbon atoms. In lubricants I and III, $R_1$ and $R_2$ are the residue of the same or different and in lubricant II different alkylene units, all individually selected from the group consisting of the residue of ethylene oxide, propylene oxide, butylene oxide and an aromatic glycidyl ether, $R_3$ is the residue of a difunctional phenol, $R_4$ is hydrogen, an acyl or alkyl group and where alkyl, derived from an aliphatic monofunctional alcohol having 1 to about 21 carbon atoms, preferably about 4 to about 18 carbon atoms and most preferably about 4 to about 12 carbon atoms or where acyl derived from an aliphatic monocarboxylic acid of 2 to about 21 carbon atoms, preferably about 4 to about 18 carbon atoms and most preferably about 6 to about 12 carbon atoms, $R_5$ is the residue of an aromatic glycidyl ether, preferably a phenyl glycidyl ether and n or m+n have a value to produce a molecular weight of about 300 to about 6000, preferably about 600 to about 5000 and most preferably about 1000 to about 4000.

12 Claims, No Drawings

METAL MOLDS COATED WITH OXIDATIVE STABLE POLYOXYALKYLENE RELEASE AGENTS

BACKGROUND OF THE INVENTION

1. Field of the Invention

This invention relates to processes for the utilization of polyoxyalkylene compounds as mold release agents or lubricants in molding processes.

2. Description of the Prior Art

In the molding of natural and synthetic rubber and certain other polymers, generally an efficient mold-release agent or lubricant is required to overcome the tendency of the polymer to stick to the mold which is often of metal. Both high temperatures and high molding pressures are often encountered in such molding processes. To facilitate the removal of the molded object, lubricants of the prior art have generally included mineral waxes, vegetable waxes, fatty acids, and metallic soaps, which are applied by spray or other methods of coating to the mold surface.

Polyoxyalkylene glycols have also been used as mold-release agents or lubricants for the molding of rubber wherein a metal mold is utilized. Stabilized polyoxyalkylene compositions such as those disclosed in U.S. Pat. No. 2,786,080 have been found useful, however, the phenothiazine utilized to stabilize these compositions upon dilution with water prior to application to the mold often precipitates from solution and thus its effectiveness as an antioxidant is reduced. In addition, the toxicity of such antioxidant materials as phenothiazine is undesirable in compositions which may be personally contacted.

In U.S. Pat. No. 3,504,081, there are disclosed lubricants and parting agents useful in the molding of rubber articles consisting of a mixture of dialkylphthalate, mono-alkyl-phenyl ether of a lower polyethylene glycol, and a higher polyethylene glycol or their alkylphenyl mono-ethers. There is no teaching that such compositions have improved resistance to oxidation under the temperature and pressure conditions utilized in molding rubber articles.

In U.S. Pat. No. 3,146,272, antioxidants for glycol derivatives are disclosed as generally any compound that is an antioxidant for polyoxyalkylene compounds which is reactive with alkylene oxides. Representative initiating compounds for the polymerization of an alkylene oxide are disclosed as phenols, alkyl phenols, aryl phenols, phenothiazine and various derivatives thereof, aryl sulfonamides, aryl amines, and alkyl aryl amines. The disclosed antioxidants are useful in combination with polyoxyalkylene compounds to reduce weight loss which occurs upon heating at elevated temperatures.

In U.S. Pat. No. 3,253,932, there are disclosed mold-release compositions consisting essentially of a polymer of an α-olefin hydrocarbon and an inert organic diluent as external lubricants, for instance, in injection molding of plastics.

A Bisphenol A, bis(propylene glycol) ether dilaurante, is disclosed as a component of a stabilized lubricant for nylon and polyester fibers in Japanese 76-70,397. The use of a difunctional phenol such as resorcinol as an initiator in the preparation of polyoxypropylene surfactants is disclosed in U.S. Pat. No. 2,674,619 and U.S. Pat. No. 3,036,118; the use of aromatic compounds as initiators in the production of polyoxyalkylene polymers is disclosed in U.S. Pat. No. 2,677,700; polyoxyalkylene derivatives of phenothiazine as anti-oxidants, for petroleum lubricants, detergents, and fungicides are disclosed in U.S. Pat. No. 2,815,343 with related uses being disclosed in U.S. Pat. No. 3,376,224 and U.S. Pat. No. 4,072,619; and the use of terminal di-vic-epoxides in the production of linear thermoplastic polyether resins based upon bisphenols is shown in U.S. Pat. No. 3,637,590. The use of the same or similar polyoxyalkylene compositions of the invention as textile fiber lubricants is disclosed in U.S. Pat. No. 4,110,227.

Compositions having improved heat resistance and reduced high temperature volatility which contain an ester of an ethoxylated arylphenol are disclosed in U.S. Pat. No. 3,578,594 and the use of aromatic substituted alkylene oxides is disclosed in the production of polyoxyalkylene compounds in U.S. Pat. No. 2,677,700.

In none of these references is the utility of the oxidation-stable mold-release compositions of the invention disclosed or suggested. Accordingly, it is an object of the invention to provide to the art oxidation-stable mold-release compositions and processes for the molding of natural and synthetic rubber and other polymers wherein said mold release agents used in said compositions are resistant to volatilization under temperature and pressure conditions utilized in molding such polymers.

SUMMARY OF THE INVENTION

Mold-release compositions and lubricants having improved resistance to volatilization under elevated conditions of temperature and pressure comprise polyoxyalkylene esters which are based upon the inclusion of the residue of a phenolic compound in the polyoxyalkylene ester polymer chain either by use of a difunctional phenolic compound as an initiator for alkylene oxide polymerization or by the use of an aromatic substituted glycidyl ether as a component in the production of polyoxyalkylene lubricant. The esters are produced by reaction of a polyoxyalkylene compound with an aliphatic saturated acid.

Besides the use of the above-described polyoxyalkylene compounds as mold-release agents, it has been found that such compounds can be used in combination with prior art polyoxyalkylene compounds wherein the alkylene radicals each contain 2 to 4 carbon atoms and said compound is susceptible to oxidative deterioration. Such mold-release agents can contain an effective proportion of at least 25 percent by weight of said oxidation stable polyoxyalkylene compounds.

DETAILED DESCRIPTION OF THE INVENTION AND THE PREFERRED EMBODIMENTS

The mold-release agents or lubricants of the invention are described in more detail below and processes for the preparation thereof are also described. The improved oxidation stable polyoxyalkylene compound lubricants of the invention are useful either alone or in admixture with the polyoxyalkylene lubricant compounds of the prior art and are generically described by the formulas:

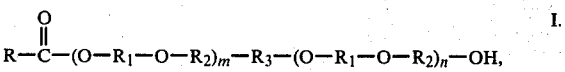

-continued

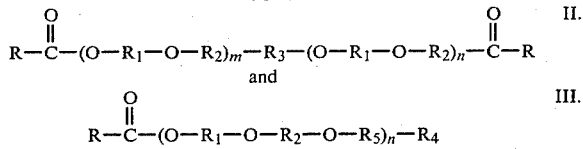

and $$R-\overset{O}{\overset{\|}{C}}-(O-R_1-O-R_2-O-R_5)_n-R_4 \quad \text{III.}$$

These lubricants when used in blends with polyoxyalkylene lubricant compounds of the prior art are preferably used in admixture with compounds selected from the group consisting of prior art compounds having the formula:

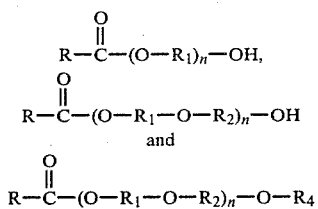

and $$R-\overset{O}{\overset{\|}{C}}-(O-R_1-O-R_2)_n-O-R_4 \quad \text{VI.}$$

in which R is individually selected from alkyl groups of 1 to about 21 carbon atoms, preferably about 7 to about 21 carbon atoms, and most preferably about 12 to about 18 carbon atoms.

In lubricants I and III, $R_1$ and $R_2$ are the residue of the same or different and in lubricant II different alkylene units, all individually selected from the group consisting of the residue of ethylene oxide, propylene oxide, butylene oxide and an aromatic glycidyl ether, $R_3$ is the residue of a difunctional phenol, $R_4$ is hydrogen, an acyl or alkyl group and where alkyl, derived from an aliphatic monofunctional alcohol having 1 to about 21 carbon atoms, preferably about 4 to about 18 carbon atoms and most preferably about 4 to abut 12 carbon atoms or where acyl derived from an aliphatic monocarboxylic acid of 2 to bout 21 carbon atoms, preferably about 6 to about 12 carbon atoms, $R_5$ is the residue of an aromatic glycidyl ether, preferably a phenyl glycidyl ether and n or m+n have a value to produce a molecular weight of about 300 to about 6000, preferably about 600 to about 5000 and most preferably about 1000 to about 4000. The lubricants of the invention useful as mold-release agents are disclosed in U.S. Patent Application, Ser. No. 834,721, filed Sept. 19, 1977, now U.S. Pat. No. 4,110,227 incorporated herein by reference.

Methods for the polymerization of polyalkylene compounds are well known in the art and are described in U.S. Pat. No. 2,674,619 and U.S. Pat. No. 3,036,018, incorporated herein by reference. The polyoxyalkylene intermediate compounds so prepared which can be, for instance, homopolymers or copolymers, i.e., block or random (heteric) copolymers of ethylene oxide and 1,2-propylene oxide, and are preferably heteric copolymers thereof, wherein the ethylene oxide content is such that the weight ratio of ethylene oxide to 1,2-propylene oxide is generally, respectively 90:10 to 10:90, preferably 80:20 to 20:80 and most preferably 75:25 to 25:75. The monoesters are formed by the reaction of this intermediate polymer with an aliphatic saturated acid having a carbon chain length of about 1 to about 21 carbon atoms, preferably about 7 to about 21 carbon atoms and most preferably about 12 to about 18 carbon atoms or $C_1-C_4$ alkyl ester thereof. Typically, in the preparation of the monoesters of the formula I, the polyoxyalkylene polymer is reacted with an equivalent or a slight excess of the methyl ester of the desired aliphatic saturated acid. The reaction is usually carried out at temperatures up to 150° C., preferably about 125° C., under a vacuum of about 1 millimeter mercury until the transesterification reaction is substantially completed. The residue of a difunctional phenolic compound is incorporated into the polyoxyalkylene ester chain either by the use of such compounds as an initiator or by use of an aromatic glycidyl ether as a component in the production of the polyoxyalkylene compound.

The difunctional phenols can be mononuclear or polynuclear. Representative examples of mononuclear difunctional phenols are resorcinol, catechol, and hydroquinone. Representative examples of polynuclear difunctional phenols are 2,2-bis(4-hydroxyphenol) propane, 2,2-bis(4-hydroxyphenol) butane, 2,6-dihydroxynaphthalene and 1,4-dihydroxynaphthalene.

Representative aliphatic saturated monocarboxylic acids, the residues of which are defined herein as R in formulas I to VI, having from about 1 to about 21 carbon atoms that can be used in the esterification are acetic, propionic, butyric, valeric, caproic, caprylic acid, capric acid, lauric acid, myristic acid, palmitic acid, stearic acid, oleic acid, behenic acid, their isomers and lower alkyl esters ($C_1$ to $C_4$), their mixtures and the like. Representative corresponding radicals, or residues, are: stearoyl, lauroyl, caproyl, oleoyl, etc. The oxidation stable polyoxyalkylene diester lubricants of the invention (II) are prepared in a similar manner to those monoester lubricants described above except that the polyoxyalkylated compound is reacted with at least 2 moles of the desired acid or acid ester for every mole of polyoxyalkylene compound to produce the desired ester. Similar saturated monocarboxylic fatty acids can be used.

The oxidation stable polyoxyalkylene compound lubricants having the formula III are prepared using a monofunctional aliphatic alcohol having 1 to about 21 carbon atoms, preferably about 8 to about 18 carbon atoms or an aliphatic monocarboxylic acid having from about 2 to about 21 carbon atoms, perferably about 8 to about 18 carbon atoms and most preferably about 6 to about 12 carbon atoms, as indicators for the production of the polyoxyalkylene compound. Useful aliphatic monofunctional alcohols include aliphatic primary alcohols such as methyl, ethyl, propyl, butyl, amyl, hexyl, heptyl, octyl, nonyl, decyl, dodecyl, tetradecyl, cetyl alcohols and corresponding secondary alcohols and their isomers, mixtures and the like. Useful monofunctional aliphatic alcohol initiators also include those alcohols produced by hydrogenation of fatty acids or glycerides obtained from animal or vegetable oils and waxes such as coconut oil, castor oil, tallow oil, tall oil and the like. Alcohols produced by the OXO process are also useful initiators. As is well known, this process involves the catalytic reaction of alpha-olefins with carbon monoxide and hydrogen under pressure to obtain primary aliphatic alcohols having branched chains. Useful OXO alcohols include isooctyl, decyl, tridecyl, pentadecyl, alcohols and their mixtures such as those sold under the trademark "NEODOL" by the Shell Chemical Company and the like. Primary aliphatic alcohols which are useful initiators also include those produced by the polymerization of ethylene with Ziegler type catalysts and subsequent reaction of the metal alkyls formed in this polymerization to obtain mixtures of straight chain primary alcohols. These alcohols can be utilized as initiators either alone or in mixtures.

As initiators, aliphatic monocarboxylic acids can be used as alternatives to the aliphatic alcohols listed above. Useful monocarboxylic aliphatic acids have carbon chain lengths of from 2 to 21 carbon atoms, preferably about 4 to about 18 carbon atoms. Typical representative acids are acetic, propionic, butyric, lauric, caproic, caprylic, capric, myristic, palmitic, stearic, oleic and the like. Where an aliphatic monocarboxylic acid or monofunctional alcohol, as described above, is utilized as an initiator in the production of the polyoxyalkylene polymers of the invention, in order to incorporate an aromatic ring, preferably a phenyl group in the polymer chain, it is necessary to include in addition to a lower aliphatic alkylene oxide or mixture thereof selected from the group consisting of ethylene, propylene and butylene oxides, an aromatic substituted alkylene oxide such as phenyl glycidyl ether. Examples of useful aromatic substituted alkylene oxides are as follows: p-methoxy phenyl glycidyl ether, p-chlorophenyl glycidyl ether, and p-methyl phenyl glycidyl ether.

The polyoxyalkylene compounds of the invention can be either homopolymers or copolymers having regularly repeating monomer units or segregated "blocks" of different structure in the polymer chain. The molecular weight of said polyoxyalkylene compounds is about 300 to about 6000 and the weight ratio of ethylene oxide utilized to the other lower alkylene oxides such as 1,2-propylene oxide or butylene oxide is generally 90:10 to 10:90, preferably 80:20 to 20:80 and most preferably 75:25. It is desirable for certain embodiments of the lubricant copolymers of the invention to maintain a ratio of ethylene oxide to lower alkylene oxide in order that the dispersibility of the lubricant in water will be suitable for the lubricating use intended. However, additional emulsifiers can be utilized in the lubricant composition.

In the production of the polyoxyalkylene compounds of the invention which are subsequently esterified to produce lubricants of the invention, it will be appreciated that in all instances a mixture of various molecular weight polymers results and that molecular weights given throughout this application are average values.

The term "polyoxyalkylene compound", as used herein, includes compounds wherein the alkylene radicals contain a substituent radical such as phenyl, chlorine, bromine, or hydroxyl or contain olefinic unsaturation. Typical examples of such compounds include the block or heteric polyoxyalkylenes, polyepichlorohydrin, polyglycidol, polyoxy-1,2- or 2,3-butylenes either alone or in admixture with other polymers derived from lower alkylene oxides present in a random sequence structure (heteric) or as segregated blocks (block polymers) and the esters thereof.

Where the oxidation stable lubricants of the invention are used in admixture with prior art polyoxyalkylene compounds, such compounds are preferably selected from the group consisting of the prior art alkoxylated fatty acid esters, specifically the ethoxylated and mixed ethoxylated-propoxylated fatty acid esters. The prior art ester alkoxylates which can be used include both block or heteric alkoxylates of fatty acids as well as the polyoxyalkylenes derived from active hydrogen compound-initiated mixed alkylene oxides including both heteric or block polymers. The initiator is, for instance, an aliphatic alcohol or acid as previously described and said polyoxyalkylene compound is subsequently esterified to form an ester with a monocarboxylic aliphatic acid preferably having about 7 to about 21 carbon atoms in the alkyl chain. Generally, the esterification reaction is conducted at a temperature of about 125° C. to about 225° C. and a vacuum of about ambient pressure to about 1 millimeter of mercury, preferably about 130° C. to about 200° C. and a vacuum of less than 10 millimeters of mercury. At least 25 percent by weight based upon total weight of the oxidation stable polyoxyalkylene compounds of the invention are used in such mixtures.

It is believed that the oxidative deterioration of polyoxyalkylene compounds of the prior art is accompanied by the formation of carbonyl compounds, peroxides and acids and the manifestation of such deterioration is formation of color. Often, a decrease in viscosity and the formation of volatile by-products as indicated by fuming of the composition at elevated temperature occurs. The tendency to fume of lubricants upon use at elevated temperature is commonly used as an indication of the oxidation stability of the lubricant. It is, therefore, common to evaluate the oxidation stability of such products by thermogravimetric analysis. For instance, evaluation of oxidation stability of products shown in the examples which follow was accomplished by utilizing a Du Pont Model 990 Thermoanalyzer.

Both dynamic and isothermal evaluations were conducted to determine the oxidation stability of the lubricants of the invention. In the dynamic method of evaluation, the sample is heated at a rate of 10° C. per minute while exposed to a compressed air flow at a flow rate of 50 milliliters per minute. The temperature is recorded after the sample has lost one percent of its original weight. In the isothermal method of evaluating oxidation stability, the sample is placed in the oven of the thermal analyzer, referred to above, the oven being preheated to 220° C., held at this temperature for 30 minutes while exposed to compressed air flowing at the rate of 50 milliliters per minute and the weight loss in percent at the end of the 30-minute interval is recorded.

Another method of evaluating the oxidation stability of the lubricants of the invention is to determine the thin film smoke point of the lubricant. In this test method, approximately 0.5 gram of the lubricant is spread evenly into a milled depression on the top surface of a steel block. The block is then heated at the rate of 10° C. per minute and the temperature at which the first smoke is observed at the surface of the sample is recorded as the thin film smoke point.

It is believed that during the molding process in which rubber and other polymer articles are formed, the action of heat and pressure results in the oxidative deterioration of polyoxyalkylene compounds present as mold-release agents. Said deterioration is accompanied by the formation of carbonyl compounds, peroxides and acids and the manifestation of such deterioration is often the formation of color or the inability of the mold-release composition to function satisfactorily as the result of the volatilization of the mold-release compound. The tendency of polyoxyalkylene mold release compositions to smoke or fume upon exposure to elevated temperatures such as about 200° C. can be utilized as an indicator of the oxidation stability of the compound. For instance, the oxidation stability of the oxidation-stable polyoxyalkylenes of the invention was determined, as disclosed in examples, utilizing a test method in which a weighed sample of polyoxyalkylene was exposed to a temperature of 220° C. for a period of 15 minutes or for a period of 30 minutes. The proportion of polyoxyalkylene remaining was determined. As shown below, a substantial proportion of the oxidation stable polyoxyalkylenes of this invention is retained after exposure to these conditions of temperature.

In the process of lubricating a metal mold, the polyoxyalkylenes of the invention are applied as coatings in admixture with an inert, volatile diluent or carrier to the mold surface or mold face. Said polyoxyalkylenes are dissolved or dispersed in said inert, volatile liquid diluent or carrier such as water, a low molecular weight alcohol or a low boiling ketone, for instance, methyl alcohol, ethyl alcohol, acetone, and methyl ethyl ketone, to prepare the mold release compositions of the invention. Water is preferred as the carrier. Generally the concentration of the compound of this invention in such diluted form is not narrowly critical and can vary widely depending upon the intended use. In general, the concentration of the inert carrier will vary from about 0.1 percent to about 90 weight percent, preferably about 15 to about 85 percent by weight, and most preferably about 40 to about 70 percent by weight. The mold-release compositions are readily prepared by mixing said polyoxyalkylenes with the inert, volatile liquid carrier in any convenient fashion, for instance, by stirring. In some cases to achieve a uniform mixture, it may be necessary to heat the mixture or to cool the mixture below room temperature.

While the mold-release compositions of the invention are particularly suited for use with natural and synthetic rubber, other polymer compositions ordinarily subjected to a molding operation can be more conveniently produced utilizing the mold release compositions of the invention. The mold release compositions of the invention are effective with synthetic rubbers such as styrene-butadiene rubber, neoprene rubber, nitrile rubber, polysulfide rubber and cis-1,4-isoprene rubbers. Various molded polymers also can be produced using said mold-release compositions such as polyurethane polymers, polyesters, polystyrene, polyamides and polyvinyl chloride.

The polyoxyalkylene compound mold release agents of the invention are suited for a wide variety of general polymer processing methods or molding techniques. For instance, the mold-release agents of the invention can be used as internal mold-release agents in the compression molding of polyvinyl chloride polymers. The mold-release compositions of the invention can also be employed as internal lubricants for other polymers which are to be molded. In such applications, the mold-release compositions of the invention can be employed to increase melt fluidity of certain high molecular weight polymers which are to be processed or subjected to a molding operation. The requirement here is for a lubricant or mold-release agent that is incompatible or partially compatible with the high molecular weight polymer. In this application, the lubricant or mold-release composition must not be seriously degraded by the processing temperature to which the polymer is subjected. Examples of such molding processes are injection or jet molding. Injection molding involves heating a polymer molding powder or granules thereof in an enclosed cylinder to a suitable temperature at which point a piston pushes the softened polymer through a nozzle along runners into a cool mold. In this application, the polyoxyalkylene compound mold-release agents of the invention are generally used admixed with a polymer. Examples of useful polymers are: polyurethanes, polyesters, polystyrenes, polyamides, and polyvinyl chloride. The mold release compositions can also be applied separately to the enclosed cylinder, piston, and ram as well as the cold mold. The mold-release compositions are also useful in extruding machines wherein a heat-softened polymer material is forced through an orifice or die to produce rods, tubes, etc.

The amount of mold-release composition employed generally will depend upon the particular use and the particular polymer with which the mold-release composition or lubricant of the invention is employed. Where the mold-release compositions of the invention are partially compatible with the high molecular weight polymer, amounts ranging from about one percent up to about 40 weight percent can be employed. However, if the lubricant or mold-release composition of the invention is not compatible with the high molecular weight polymer, amounts ranging from about 0.1 up to about 5 weight percent can be employed.

The invention will be further illustrated by the following specific examples. Where not otherwise specified throughout this specification and claims, temperatures are given in degrees Centigrade and parts, percentages, and proportions are by weight.

EXAMPLE 1

This example illustrates the preparation of a mold-release agent or lubricant of the invention which is the stearate ester of a hydroquinone-initiated heteric polymer consisting of 75 percent ethylene oxide and 25 percent propylene oxide by weight.

A polyoxyalkylene intermediate was prepared by adding two moles of di($\beta$-hydroxyethyl)hydroquinone to an autoclave equipped with temperature, pressure and vacuum controls. The hydroquinone was melted under a nitrogen atomsphere at a temperature of 105° C. to 110° C. Thereafter, 10 grams of a 90 percent potassium hydroxide solution were added and the autoclave heated to 125° C. after evacuating to a vacuum of less than 10 millimeters of mercury. The vacuum was broken after the removal of 6 grams of volatiles and nitrogen was added to give a pressure of 3–7 pounds per square inch gauge. A mixture of 9.9 moles of propylene oxide and 39.2 moles of ethylene oxide was then added over a period of about 6½ hours. The mixture was held an additional 2 hours at 125° C. to insure complete reaction and then the polyoxyalkylene intermediate was recovered and found to have a hydroxyl number of 96.2.

The stearate ester of this intermediate was prepared by transesterification. The polyoxyalkylene intermediate was added in the amount of 1.1 moles to a 3-liter flask equipped with a means for stirring, distillation apparatus and temperature control means. The intermediate was heated to 130° C. and volatiles removed by vacuum. Methyl stearate in the amount of 0.6 mole was then added and the flask evacuated to less than 10 millimeters of mercury and the temperature held at 130° C. for about 80 minutes. Sodium methoxide in the amount of 0.5 gram was added as a catalyst and the transesterification reaction was allowed to proceed at a vacuum of less than 10 millimeters of mercury at a temperature of 130° C. for an additional 105 minutes. The balance of methyl stearate, 0.5 mole was then added and the flask was evacuated to remove volatiles. After 60 minutes, additional sodium methoxide in the amount of 0.5 gram was added and the reaction continued at a vacuum of less than 10 millimeters of mercury at a temperature of 130° C. for an additional 105 minutes. The product obtained was deionized and the desired monostearate ester of the ethoxylated propoxylated hydroquinone-initiated polymer was obtained having a hydroxyl number of 42.3 (theoretical 38.1), an acid number of 1.32, a sodium ion concentration of 34.5 parts per million by weight and a potassium ion concentration of 5.5 parts per million by weight.

EXAMPLE 2

This example illustrates the preparation of the stearate ester of a hydroquinone-initiated heteric propylene oxide-ethylene oxide polymer having a weight ratio respectively of 70 propylene oxide and 30 ethylene oxide. The proportions and procedures of Example 1 were repeated to prepare a lubricant of the invention (having a theoretical hydroxyl number of 37.8) except that the deionizing process of Example 1 was eliminated and the crude product was reacted with sufficient acetic acid to neutralize the base catalyst used.

EXAMPLE 3

The procedure of Example 1 was repeated except that the polyoxyalkylene intermediate had a weight ratio of 70 parts of propylene oxide and 30 parts ethylene oxide. The crude product was deionized to remove the base catalyst. The product had a hydroxyl number of 40.7 (theoretical 37.8) and an acid number of 0.5.

EXAMPLE 4

This example illustrates the preparation of the laurate ester of a resorcinol-initiated heteric polyoxyalkylene compound having a weight ratio of 70 parts propylene oxide and 30 parts ethylene oxide. The same procedure and proportions are utilized as described in Example 2. The product obtained had a hydroxyl number of 52 (theoretical 38.7) and an acid number of 7.8.

EXAMPLE 5

Example 4 was repeated except that a transesterification reaction utilizing methyl stearate was performed in order to obtain a stearate ester of a resorcinol-initiated heteric polyoxyalkylene having 70 parts propylene oxide and 30 parts ethylene oxide by weight. The product had a hydroxyl number of 44.5 (theoretical 36.6) and an acid number of 6.4.

EXAMPLE 6

The procedure and proportions of Example 4 were repeated except that the resorcinol-initiated heteric polyoxyalkylene intermediate had a 75 parts ethylene oxide and 25 parts propylene oxide weight ratio and the base catalyst was removed by a deionization process. The product had a hydroxyl number of 51 (theoretical value of 40.2), an acid number of 1.6, a sodium ion concentration of 114 parts per million and a potassium ion concentration of 17 parts per million by weight.

EXAMPLE 7

Following the procedure of Example 1, a lubricant was prepared consisting of the laurate ester of a hydroquinone-initiated heteric polymer consisting of 70 parts of propylene oxide by weight and 30 parts of ethylene oxide by weight. The crude product was deionized to remove the base catalyst giving the desired lubricant. Hydroxyl number was found to be 57.6 (theoretical value 41.4), the acid number was 1.2, the sodium ion concentration was 92 parts per million by weight and the potassium ion concentration was 1.2 parts per million by weight.

EXAMPLE 8

In accordance with the procedure of Example 1, a lubricant was prepared consisting of the stearate ester of a resorcinol-initiated heteric polymer containing 75 parts ethylene oxide by weight and 25 parts propylene oxide by weight. The desired lubricant was found to have a hydroxyl number of 47.0 (theoretical 38.3) and an acid number of 0.6.

EXAMPLE 9

In accordance with the procedure of Example 1, a lubricant consisting of the laurate ester of a hydroquinone-initiated heteric polymer containing 75 parts ethylene oxide by weight and 25 parts propylene oxide by weight was prepared. The crude lubricant product, after deionization to remove the base catalyst, had a hydroxyl number of 47.2 (theoretical value 40.7), an acid number of 1.7, a sodium ion concentration of 99 parts per million and a potassium ion concentration of 11 parts per million by weight.

EXAMPLE 10 (COMPARATIVE EXAMPLE)

For comparative purposes, a lubricant of the prior art, forming no part of this invention, was prepared by adding by weight 75 parts ethylene oxide and 25 parts propylene oxide to stearic acid in accordance with the teaching of U.S. Pat. No. 3,925,588 and British Pat. No. 1,460,960. The final product was deionized to remove the base catalyst and obtain a product having a molecular weight of approximately 1400, a hydroxyl number of 40.7, an acid number of 0.71, a sodium ion concentration of 19.2 parts per million by weight and a potassium ion concentration of 3.6 parts per million by weight.

EXAMPLE 11 (COMPARATIVE EXAMPLE)

A refined coconut oil available commercially under the trademark "COBEE 76" from PVO International Incorporated was utilized for comparative purposes in the test following.

A typical analysis of the product is as follows: iodine value: 9, saponification value: 255, lauric acid: 48 percent by wieght and unsaturated fatty acid: 8 percent by weight.

EXAMPLE 12 (Comparative Example)

The lubricant of Example 10, which is not a part of this invention, was heat stabilized by the addition of 3 percent of a commercial antioxidant sold under the trademark "TOPANOL CA". This material is available commercially from ICI United States Incorporated and is described as a phenol condensation product.

EXAMPLE 13 (Comparative Example)

The lubricant of Example 10, forming no part of this invention, was stabilized by adding 1.5 percent of the phenol condensation product sold under the trademark "TOPANOL CA".

EXAMPLE 14 (Comparative Example)

The lubricant of Example 10, forming no part of this invention, was stabilized by the addition of 1 percent of a phenol condensation product sold under the trademark "TOPANOL CA".

EXAMPLE 15

A mixture of 25 parts by weight and 75 parts by weight, respectively, of a lubricant of the invention, Example 8, and a prior art lubricant, Example 10, was made and evaluated for heat stability by thermogravimetric analysis. One percent weight loss occurred at 239° C.; 14 percent weight loss occurred after heating at 220° C. for one-half hour. This compares with 228° C. and 31.5 percent weight loss for the prior art lubricant of Example 10.

EXAMPLE 16

A mixture of 25 parts by weight and 75 parts by weight of the lubricants of Examples 1 and 10, respectively, was made and evaluated for heat stability as in Example 15. One percent weight loss occurred at 232° C.; 21.5 percent weight loss occurred after heating for one-half hour at 220° C.

In order to evaluate the physical properties of the lubricants of the invention, the following test methods were utilized. The heat stability of the lubricants of the invention was evaluated by thermogravimetric analysis in which a standard quantity of fiber lubricant was heated from a temperature of 25° C. at the rate of 10° C. per minute until one percent weight loss was obtained. The temperature at this point is recorded as the dynamic heat resistance of the lubricant. A second method of evaluating the heat resistance of the lubricants of the invention was by heating 60 milligrams of lubricant at a temperature of 220° C. for a period of 30 minutes. The percent weight loss is recorded and is termed the "isothermal heat resistance" of the sample.

Not only weight loss at elevated temperature is important in a lubricant but the remaining lubricant or residue subsequent to volatilization of a portion of the lubricant is of interest. Therefore, residue formation in the lubricants of the invention was evaluated by heating 0.2 gram of the lubricant for a period of 8 hours at a temperature of 220° C. in a circulating air oven. The proportion of residue remaining and the nature of the residue is recorded in this test.

A third test designed to evaluate the heat resistance of the lubricants of the invention is the thin film smoke point test. In this procedure, 0.5 gram of lubricant is heated at the rate of 10° C. per minute until smoke is first observed rising from the surface of the sample. The temperature is recorded as the smoke point. (See Tables I, II, and III.)

EXAMPLE 17 (control)

This example forms no part of the invention but illustrates the preparation of a prior art mold-release or lubricant composition for rubber.

In accordance with procedures well known in the prior art, a heteric polyoxyalkyene glycol of 4000 molecular weight having a ratio of 75/25 respectively of ethylene oxide and 1,2-propylene oxide was prepared and blended with 15 percent water, 0.25 percent potassium acetate and 1.5 percent phenothiazine. In addition, two percent of a nonionic surfactant was added. The mixture was then diluted with water until a 35 percent active mixture was obtained. The mixture upon standing developed a red precipitate which was believed to be phenothiazine.

EXAMPLE 18

This example illustrates the use of a polyoxyalkylene glycol as a mold-release agent in the molding of rubber.

Utilizing the composition of Example 1, water is added thereto until a concentration of 37 percent active ingredient is obtained. Natural rubber in a green or uncured stage is molded around a metal form in the form of automobile radiator hose by first dumping a scoop of the previously diluted mold-release composition onto a metal mandrel or form for molding a hose. The rubber is next applied around the metal mold together with several layers of rayon fabric reinforcement. The assembly is then placed in an autoclave in which it is heated to a temperature of 210° C. for a period of about 10 minutes in order to cure the rubber hose composition. The cured hoses are then manually pulled off the mold forms. It should be noted that the hoses are molded having corrugations along the length of the hose and these corrugations are of such depth that the hose could not be pulled off the form where the mold release utilized is ineffective as the result of substantially all the polyoxyalkylene glycol mold-release agent being volatilized during cure of the rubber hose.

EXAMPLE 19

The following polymers are molded generally in accordance with the procedure of Example 18 using the polyoxyalkylene of Example 1 in combination with 50 percent by weight of water as a mold-release composition which is applied to a metal mold prior to molding the polymers: polyurethane, polyester, polystyrene, polyamide, and polyvinylchloride.

While this invention has been described with reference to certain specific embodiments, it will be recognized by those skilled in the art that many variations are possible without departing from the scope and spirit of the invention.

Table I

| | | Thermogravimetric Analysis | | | Residue after | |
|---|---|---|---|---|---|---|
| Example | Variable | Dynamic °C. at 1% Weight Loss | Isothermal % Weight Loss at 220° C.-½ Hour | Smoke Point (°C.) | 8 Hours at 220° C. % Weight | Nature of Residue |
| | Stearate Ester | | | | | |
| 1 | Hydroquinone Initiator | 230 | 3.5 | 204 | 27.1 | Liquid |
| 8 | Resorcinol Initiator | 255 | 5.9 | 192 | 11.6 | Varnish |
| | Laurate Ester | | | | | |
| 6 | Resorcinol Initiator | 222 | 7.8 | 193 | 30.8 | Liquid |
| 9 | Hydroquinone Initiator | 250 | 4.4 | 200 | 45.6 | Liquid |

*HEAT STABILITY OF LUBRICANTS OF THE INVENTION HAVING A POLYOXYALKYLENE RATIO OF 75 ETHYLENE OXIDE AND 25 PROPYLENE OXIDE*

Table I-continued
HEAT STABILITY OF LUBRICANTS OF THE INVENTION HAVING A POLYOXYALKYLENE RATIO OF 75 ETHYLENE OXIDE AND 25 PROPYLENE OXIDE

| | | Thermogravimetric Analysis | | Smoke | Residue after | |
|---|---|---|---|---|---|---|
| | | Dynamic | Isothermal | Point | 8 Hours | Nature |
| | | °C. at 1% | % Weight Loss at | | at 220° C. | of |
| Example | Variable | Weight Loss | 220° C.-½ Hour | (°C.) | % Weight | Residue |
| | Resorcinol Initiated | | | | | |
| 8 | Stearate Ester | 255 | 5.9 | 192 | 11.6 | Varnish |
| 6 | Laurate Ester | 222 | 7.8 | 193 | 30.8 | Liquid |
| | Hydroquinone Initiated | | | | | |
| 1 | Stearate Ester | 230 | 3.5 | 204 | 27.1 | Liquid |
| 9 | Laurate Ester | 250 | 4.4 | 200 | 45.6 | Liquid |

Table II
HEAT STABILITY OF LUBRICANTS OF THE INVENTION HAVING VARIOUS RATIOS OF ETHYLENE OXIDE (EO) AND PROPYLENE OXIDE (PO)

| | | Thermogravimetric Analysis | | Smoke | Residue after | |
|---|---|---|---|---|---|---|
| | | Dynamic | Isothermal | Point | 8 Hours | Nature |
| | | °C. at 1% | % Weight Loss at | | at 220° C. | of |
| Example | Variable | Weight Loss | 220° C.-½ Hour | (°C.) | % Weight | Residue |
| | Resorcinol-Initiated | | | | | |
| | Stearate Ester | | | | | |
| 8 | 75 EO/25 PO | 255 | 5.9 | 192 | 11.6 | Varnish |
| 5 | 70 PO/30 EO | 260 | 2.5 | 216 | 39.0 | — |
| | Hydroquinone-Initiated | | | | | |
| | Laurate Ester | | | | | |
| 9 | 75 EO/25 PO | 250 | 4.4 | 200 | 45.6 | Liquid |
| 7 | 70 PO/30 EO | 238 | — | 198 | 20.1 | Liquid |

Table III
HEAT STABILITY OF COMPARATIVE EXAMPLES OF PRIOR ART LUBRICANTS

| | | Thermogravimetric Analysis | | Smoke | Residue after | |
|---|---|---|---|---|---|---|
| | | Dynamic | Isothermal | Point | 8 Hours | Nature |
| | | °C. at 1% | % Weight Loss at | | at 220° C. | of |
| Example | Variable | Weight Loss | 220° C.-½ Hour | (°C.) | % Weight | Residue |
| 10 | 75 EP/25 PO Heteric Stearic Acid Ester | 228 | 31.5 | 177 | 0.4 | Varnish |
| 11 | Refined Coconut Oil | 278 | — | 198 | 21.7 | Varnish |
| 12 | Example 10 + 3% Antioxidant | 297 | — | — | — | — |
| 14 | Example 10 + 1% Antioxidant | 276 | — | — | — | — |

The embodiments of the invention in which an exclusive property or privilege is claimed are defined as follows:

1. The process of lubricating the surface of a metal mold comprising coating said surface with a polyoxyalkylene composition comprising a compound selected from the group consisting of compounds having the formula:

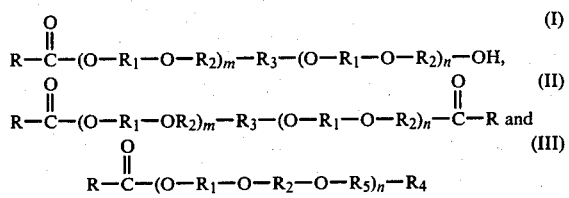

wherein R is an alkyl group having 1 to about 21 carbon atoms, m+n has a value to produce a molecular weight of about 300 to about 6000, $R_1$ and $R_2$ in the formulas (I) and (III) are the residues of the same or different and in formula (II) different alkylene units derived from alkylene oxides individually selected from the group consisting of ethylene oxide, propylene oxide, butylene oxide and an aromatic glycidyl ether, $R_3$ is the residue of a difunctional phenol, $R_5$ is the residue of an aromatic glycidyl ether, $R_4$ is hydrogen, an alkyl group derived from an aliphatic mono-functional alcohol having 1 to about 21 carbon atoms or an acyl group derived from an aliphatic monocarboxylic acid having about 2 to about 21 carbon atoms and n has a value to produce a molecular weight of about 300 to about 6000.

2. The process of claim 1 wherein $R_3$ is derived from a dihydroxyphenol.

3. The process of claim 2 wherein $R_3$ is selected from the group consisting of the residue of resorcinol, catechol, hydroquinone, and bisphenol A.

4. The process of claim 3 wherein said polyoxyalkylene composition is a heteric mixture of lower alkylene oxides selected from the group consisting of ethylene oxide and 1,2-propylene oxide wherein the weight ratio of ethylene oxide to 1,2-propylene oxide is 90:10 to 10:90.

5. The process of claim 4 wherein said polyoxyalkylene composition is a heteric mixture of 25 percent by weight of 1,2-propylene oxide and 75 percent by weight ethylene oxide.

6. The process of lubricating the surface of a metal mold comprising coating said surface with a composition comprising a polyoxyalkylene lubricant compound having the formula:

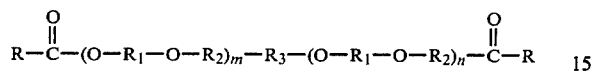

wherein R is individually selected from alkyl groups having 1 to about 21 carbon atoms, $R_1$ and $R_2$ are the residues of different alkylene units derived from alkylene oxides individually selected from the group consisting of ethylene oxide, propylene oxide, butylene oxide and an aromatic glycidyl ether, $R_3$ is the residue of a dihydroxy phenol and $m+n$ has a value to produce a molecular weight of about 300 to about 6000.

7. The process of lubricating the surface of a metal mold comprising coating said surface with a composition comprising a polyoxyalkylene compound having the formula:

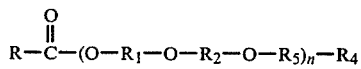

wherein R is an alkyl group having 1 to about 21 carbon atoms, $R_1$ and $R_2$ are the residues of different alkylene units individually selected from the group consisting of the residue of ethylene oxide, propylene oxide, butylene oxide and an aromatic glycidyl ether, $R_5$ is the residue of an aromatic glycidyl ether, $R_4$ is hydrogen, an alkyl group derived from an aliphatic monofunctional alcohol having 1 to about 21 carbon atoms or an acyl group derived from an aliphatic monocarboxylic acid having about 2 to about 21 carbon atoms and n has a value to produce a molecular weight of about 300 to about 6000.

8. The process of lubricating the surface of a metal mold comprising coating said surface with a composition comprising a mixture of an effective proportion of at least about 25 percent by weight based on the total weight of the mixture of a first polyoxyalkylene lubricant compound selected from the group consisting of a compound or mixtures thereof having the formulas:

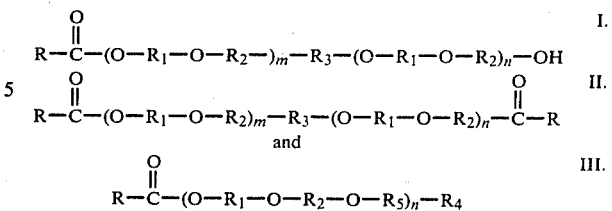

and a second polyoxyalkylene compound selected from the group consisting of a lubricant compound or mixtures thereof having the formulas:

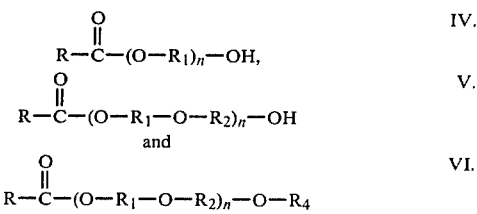

wherein R is individually selected from alkyl groups having 1 to about 21 carbon atoms, $R_1$ and $R_2$ in lubricants I, III, V and VI are the residues of the same or different and in lubricant II different alkylene units individually selected from the residues of ethylene oxide, propylene oxide, butylene oxide, and an aromatic glycidyl ether, n or $n+m$ is of a value to produce a molecular weight of about 300 to about 6000, $R_3$ is the residue of a difunctional phenol, $R_4$ is hydrogen or an alkyl group having 1 to about 21 carbon atoms derived from an aliphatic monofunctional alcohol or an aliphatic monocarboxylic acid having 2 to about 21 carbon atoms and $R_5$ is the residue of an aromatic glycidyl ether.

9. The process of claims 7 or 8 wherein $R_3$ is derived from a dihydroxyphenol.

10. The process of claim 9 wherein $R_3$ is selected from the group consisting of the residue of resorcinol, catechol, hydroquinone, and bisphenol A.

11. The process of claim 10 wherein said polyoxyalkylene composition is a heteric mixture of lower alkylene oxides selected from the group consisting of ethylene oxide and 1,2-propylene oxide wherein the weight ratio of ethylene oxide to 1,2-propylene oxide is 90:10 to 10:90.

12. The process of claim 11 wherein said polyoxyalkylene composition is a heteric mixture of 25 percent by weight of 1,2-propylene oxide and 75 percent by weight ethylene oxide.

* * * * *